Aug. 27, 1946.                L. W. CHUBB                2,406,320
                        RECOGNITION LIGHT SYSTEM
                         Filed Sept. 15, 1943
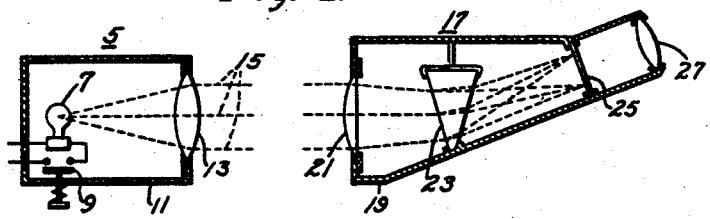
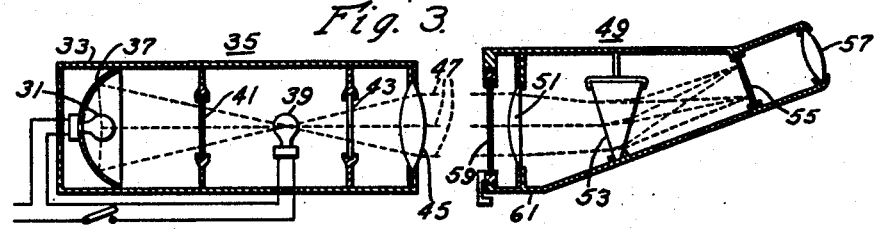
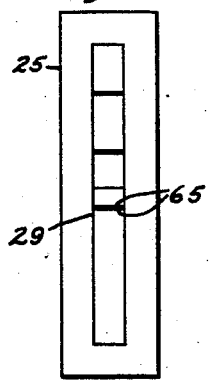
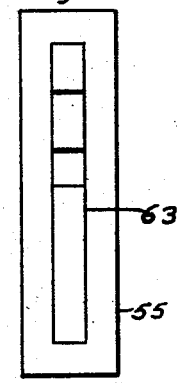
WITNESSES:                                          INVENTOR
Leon M. Garman                                   Lewis W. Chubb.
John F. Shipman                                  BY
                                                 F. N. Lyle
                                                 ATTORNEY Patented Aug. 27, 1946

2,406,320

UNITED STATES PATENT OFFICE 2,406,320

RECOGNITION LIGHT SYSTEM

Lewis W. Chubb, Pittsburgh, Pa., assignor to Westinghouse Electric Corporation, East Pittsburgh, Pa., a corporation of Pennsylvania Application September 15, 1943, Serial No. 502,501

8 Claims. (Cl. 88—1)

This invention relates to a recognition light system and has particular relation to such a system in which the distinguishing features of the light may be maintained secret.

Rapid and accurate identification of approaching objects is particularly important in connection with the operations of various military units. For example, a friendly airplane approaching a fortified base at night may be endangered by the defenses of the base unless the plane can make its identity known. Light systems render themselves very well to purposes of identification under many conditions but the ordinary light signalling system is difficult to maintain secret. Any method of identification for military purposes must be hidden from strangers, at least to the extent that the method and manner of operation cannot be readily analyzed and duplicated. Signals by light flashes alone can be recorded and easily duplicated. Color differences in light may also be quickly copied if detectable to the unaided eye. Polarization of light alone may also be readily detected.

It is, accordingly, an object of my invention to provide a new and improved recognition light system which cannot be readily analyzed and duplicated.

It is another object of my invention to provide a recognition light system employing a light having hidden characteristics.

A further object of my invention is to provide a novel recognition light system in which numerous combinations of different hidden characteristics of a light may be used.

In accordance with my invention a light which has a known spectrum is employed for transmitting the recognition signal. A receiver is adapted to be positioned in a beam from the light and comprises a screen having thereon a spectrum corresponding to that produced from a preselected standard light, and means for producing the spectrum of the received light on the screen for comparison with the spectrum of the standard light. If the spectrum of the light received corresponds exactly with the standard spectrum, it is an indication that the light transmitter is one with which the receiver is designed to be associated.

A recognition light including light having a line spectrum is preferable for it permits an accurate comparison of its spectrum with lines marked on the screen which correspond with the spectrum of the preselected standard light. The light source selected to provide the standard spectrum and thereafter employed in the transmitter may then be a gas discharge lamp filled with any one or any combination of several gases and vapors, each of which has a different line spectrum. Duplication or use of a counterfeit transmitter may be made more difficult by employing different light sources at different times.

To hide the characteristics of the light having a line spectrum, I propose to mix such light with a second light having a continuous or a band spectrum. Means are then provided to effect separation at the receiver of the light having the line spectrum which light is thereafter employed to produce a spectrum for comparison with the standard spectrum. Thus, the transmitted light beam gives the appearance of an ordinary light but includes light having a line spectrum code which may be separated from the rest of the beam for purposes of identification.

In addition to the numerous spectra which may be obtained from available gas discharge lamps, further hidden characteristics may be obtained by the use of filters. With any light source having a given spectrum, filters may be employed to remove part of the spectrum. In this manner further combinations are made available to make the use of a counterfeit transmitter more difficult.

The novel features which I consider characteristic of my invention are set forth with particularity in the accompanying claims. The invention, however, both as to its organization and operation, together with additional objects and advantages thereof will best be understood from the following description of specific embodiments thereof with reference to the accompanying drawing, in which:

Figure 1 illustrates one embodiment of my invention;

Fig. 2 is a plan view of the screen employed in the apparatus shown in Fig. 1;

Fig. 3 illustrates a modification of my invention; and

Fig. 4 is a plan view of the screen employed with the apparatus of Fig. 3.

As shown in Figs. 1 and 2, the transmitter 5 includes a gas discharge lamp 7 operable at will by means of a push-button switch 9. The lamp 7 is mounted within a housing 11 which supports a lens 13 so that the transmitter produces a beam of light illustrated in a general way by dotted lines 15. Other light sources having a line spectrum may, of course, be employed in place of the gas discharge lamp. However, such a lamp is readily manufactured and may contain various gases and vapors to produce various line spectra.

A receiver 17 comprises a housing 19 upon which is mounted a cylindrical lens 21. The housing 19 is adapted to be positioned in the path of the beam from the transmitter 5 so that the cylindrical lens 21 focuses the received beam in one plane. Light passing through the lens 21 also passes through a glass prism 23 mounted within the housing 19 which disperses the light into a spectrum focused on a screen 25. The screen 25 is mounted within the housing 19 but is arranged to be readily removable for replacement by another screen. An additional lens 27 is mounted behind the screen 25 and forms part of an eyepiece permitting the operator to view the spectrum on the screen.

The screen 25 may be of a material through which light may pass with a spectrum 29 of lines through which light may not pass marked thereon. These lines are positioned to correspond with the line spectrum of the selected light source so that with the receiver properly oriented, the spectrum of the received light is superimposed thereon. Consequently, if no light passes through the screen, the operator is assured that the received light has a spectrum exactly like the standard selected. For purposes of illustration, the spectrum 29 in Fig. 2 is shown as including the outstanding lines of the visible spectrum of a mercury vapor lamp.

It is apparent that an eyepiece is not necessary to the operation of the receiver as any method of detecting a complete cutoff of the light may be used. Direct observation of the spectral image is preferable, however, as the observer can readily tell which way to adjust the position of the receiver to shift the spectral lines for accurate comparison with the standard spectrum on the screen.

It is to be noted that the use of a screen which may pass light and lines which may not pass light is not essential to an operable system as any arrangement permitting comparison of the spectrum of the received light with a standard is satisfactory. The standard spectrum may be formed on the screen in various ways. For example, the lines may be positioned thereon to correspond with measured positions of actual spectral lines; the lines may be photographically developed on the screen; or actual standard light sources may be employed to produce a spectrum on the screen. Probably the simplest and most accurate method of forming the standard spectrum on the screen is by a photographic method. The light to be transmitted is first selected. A photographic film may then be placed in the position of the screen and exposed to the spectrum of the selected light. The film is then developed and used as the screen, there being black lines on the film corresponding to the spectral lines of the selected light. It is also to be understood that while line spectral light is preferable, lights having spectrums of other types might be employed.

The apparatus as shown in Fig. 1 may use a lamp which in most cases produces a colored light. Should the color prove to be too much of an aid in analyzing the system, a system as shown in Fig. 3 may be employed. A hot filament or incandescent lamp 31 having a continuous spectrum and giving a substantially white light is mounted within the housing 33 of the transmitter 35. An elliptical mirror 37 is arranged to focus the light from the hot filament lamp 31 on a gas discharge lamp 39. The gas discharge lamp 39 produces light having a line spectrum and may be similar to the lamp 7 of Fig. 1.

A polarizing element 41 is mounted between the hot filament lamp 31 and gas discharge lamp 39. The polarizing element 41 may be a sheet of tourmaline, a Nicol prism or other well known polarizing substance, and serves to give the continuous spectral light a plane polarization. It is to be noted that the continuous spectral light may be given a circular polarization instead of a plane polarization, if desired, the plane polarization being described in connection with Fig. 3 for purposes of simplification.

The mixed polarized continuous spectral light and unpolarized line spectral light may then pass through a filter 43 mounted within the housing 33 and a lens 45 for producing a beam of light represented by lines 47. The filter 43 serves to remove one or more of the lines from the spectrum of the line spectral light. The filter is removable so that variations may be employed to give different combinations, or the filter may be omitted completely. Thus, the transmitter produces a beam of light made up of polarized continuous spectral light and unpolarized spectral light having a selected line spectrum. The continuous spectral light is relatively strong and being substantially white serves to hide the other light containing the spectral code so that the transmitted light beam is not noticeably different from other light.

The receiver 49 is somewhat similar to that shown in Fig. 1 having a cylindrical lens 51, glass prism 53, screen 55 and eyepiece lens 57 corresponding to the cylindrical lens 21, prism 23, screen 25 and eyepiece lens 27 of Fig. 1. In addition a suitable analyzer 59 is rotatably mounted on the housing 61 of the receiver in front of the cylindrical lens 51. The analyzer 59, when properly positioned, rejects the polarized component of the received light beam but permits the unpolarized line spectral light component to pass therethrough so that its spectrum may be projected on the screen 55 for comparison with the standard.

The standard spectrum formed on the screen must, of course, correspond to the selected lamp 39 in combination with the associated filter 43. Thus, if a mercury vapor lamp is employed to provide the line spectrum light component of the transmitted beam and a Didymium filter, such as Corning #512, is employed, the spectrum 63 on the screen 55 is as shown in Fig. 4. This spectrum corresponds to the visible mercury spectrum of Fig. 3 with the yellow lines 65 being omitted.

To duplicate the transmitter from information obtained by observation, photography or analysis is difficult if not impossible. Moreover, as previously indicated, lamps containing different gases or vapors may be employed in the transmitter along with different filters in accordance with a predetermined time schedule. Therefore, to construct a duplicate transmitter, a stranger must not only be familiar with the general method employed, but must also know the particular combination of lamps and filters employed at any particular time. With so many variables, it is extremely doubtful if a counterfeit transmitter could be employed without detection.

It is apparent that the system is comparable to a combination lock with many tumblers. In addition to its use by an observer in recognizing an approaching object, it may also be used in various other applications where a secret light code is desirable.

Although I have shown and described my invention as applied to certain specific embodiments, I am aware that many modifications thereof may be employed. My invention, therefore, is not intended to be restricted to the specific embodiments shown.

I claim as my invention:

1. In combination, means for producing a beam of light made up of a polarized light component having other than a line spectrum and an unpolarized light component having a line spectrum, a receiver adapted to be positioned in the path of said beam and comprising polarization analyzing means effective to separate at least a portion of said unpolarized light component from said beam, a screen having thereon lines corresponding to the spectrum produced from a preselected light having a line spectrum, and means for producing the spectrum of said separated portion of said unpolarized light component on said screen for comparison with said lines.

2. In combination, means for producing a beam of light made up of a polarized light component having a continuous spectrum and an unpolarized light component having a line spectrum, a receiver adapted to be positioned in the path of said beam and comprising polarization analyzing means effective to separate at least a portion of said unpolarized light component from said beam, a screen having thereon lines corresponding to the spectrum produced from a preselected light having a line spectrum, and means for producing the spectrum of said separated portion of said unpolarized light component on said screen for comparison with said lines.

3. In combination, means for producing a beam of light made up of a polarized light component having other than a line spectrum and an unpolarized light component having a line spectrum, a receiver adapted to be positioned in the path of said beam and comprising polarization analyzing means effective to separate at least a portion of said unpolarized light component from said beam, a screen through which light may pass having thereon lines through which light may not pass corresponding to the spectrum produced from a preselected light having a line spectrum, means for projecting on said screen the spectrum of said separated portion of said unpolarized light component superimposed on said lines, and means for determining if any of the light of said projected spectrum passes through said screen.

4. In a recognition light system, a first source of light having a continuous spectrum, means for polarizing light from said first source, a second source of light having a line spectrum, filtering means for removing one or more lines from the spectrum of said second source, means for producing a beam of light composed of polarized light from said first source and filtered light from said second source, a receiver adapted to be positioned in the path of said beam and comprising polarization analyzing means effective to separate at least a portion of said unpolarized light from said beam, a screen having thereon lines corresponding to a spectrum produced from light from a standard source having a line spectrum projected through a standard line filter for removing a preselected one or more lines from the spectrum of said standard source light, and means for producing the spectrum of the separated portion of said unpolarized filtered light of said beam on said screen for comparison with said lines.

5. A light system comprising a first source of light having a continuous spectrum, a second source of light having a line spectrum, means for producing a composite beam of light composed of a first component of light from said first source and a second component of light from said second source, the first light component in the beam serving to hide the characteristics of the second light component whereby the two light components in the beam are substantially indistinguishable, said means including means for modifying said first light component to cause it to have a particular characteristic without causing the two light components to become distinguishable, a receiver adapted to be positioned in the path of said composite beam and comprising means receiving said composite beam and responsive to said particular characteristic for withdrawing said first component and effecting isolation of at least a portion of said second component from said beam, a screen, and means for producing the spectrum of said isolated portion of the second component on said screen, the screen having markings thereon by means of which the spectrum of said isolated portion may be compared with the spectrum of a preselected standard light.

6. A light system comprising a first source of light having a continuous spectrum, a second source of light having a line spectrum, means for producing a composite beam of light composed of a first component of light from said first source and a second component of light from said second source, the first light component in the beam serving to hide the characteristics of the second light component whereby the two light components in the beam are substantially indistinguishable, said means including filtering means for removing one or more preselected lines from the spectrum of said second light component and means for modifying said first light component to cause it to have a particular characteristic without causing the two light components to become distinguishable, a receiver adapted to be positioned in the path of said composite beam and comprising means receiving said composite beam and responsive to said particular characteristic for withdrawing said first component and effecting isolation of at least a portion of said second component from said beam, a screen, and means for producing the spectrum of said isolated portion of the second component on said screen, the screen having markings thereon by means of which the spectrum of said isolated portion may be compared with the spectrum of a preselected standard light.

7. A light system comprising a first source of light having a continuous spectrum, a second source of light having a line spectrum, means for polarizing light from said first source, means for producing a composite beam of light composed of a first component of polarized light from said first source and a second component of light from said second source, the first light component serving to hide the characteristics of the second light component whereby the two light components in the beam are substantially indistinguishable, a receiver adapted to be positioned in the path of said composite beam and comprising polarization analyzing means receiving said composite beam for withdrawing said first component and effecting isolation of at least a portion of said second component from said beam, a screen, and means for producing the spectrum of said isolated portion of the second component on said screen, the screen having markings thereon by means of which the spectrum of said isolated portion may be compared with the spectrum of a preselected standard light.

8. A light system comprising a first source of light, a second source of light, means for producing a composite beam of light composed of a first light component from said first source and a second light component from said second source, the light from said first and second sources having different spectrums with the spectrum of light from the second source having certain distinctive elements and the spectrum of light from the first source including as but a fractional part thereof substantially all the same elements as the spectrum of light from said first source whereby the second light component in the beam serves to hide the distinctive elements of said first light component making the two light components substantially indistinguishable, said means including means for modifying said first light component to cause it to have a particular characteristic without causing the two light components to become distinguishable, a receiver adapted to be positioned in the path of said composite beam and comprising means receiving said composite beam and responsive to said particular characteristic for withdrawing said first component and effecting isolation of at least a portion of said second component from said beam, a screen, and means for producing the spectrum of said isolated portion of the second component on said screen, the screen having markings thereon by means of which the spectrum of said isolated portion may be compared with the spectrum of a preselected standard light.

LEWIS W. CHUBB.